US010281891B2

United States Patent
Burns et al.

(10) Patent No.: US 10,281,891 B2
(45) Date of Patent: May 7, 2019

(54) REMOTE CONTROLLER FOR CONTROLLING APPARATUS BY DIVERTING FEEDBACK SIGNAL FROM NATIVE CONTROLLER TO THE REMOTE CONTROLLER AND METHODS FOR SAME

(71) Applicant: IMFLUX INC., Hamilton, OH (US)

(72) Inventors: Brian Matthew Burns, Mason, OH (US); Gene Michael Altonen, Hamilton, OH (US)

(73) Assignee: IMFLUX INC., Hamilton, OH (US)

( * ) Notice: Subject to any disclaimer, the term of this patent is extended or adjusted under 35 U.S.C. 154(b) by 0 days.

(21) Appl. No.: 15/378,932

(22) Filed: Dec. 14, 2016

(65) Prior Publication Data

US 2017/0168471 A1 Jun. 15, 2017

Related U.S. Application Data

(60) Provisional application No. 62/266,996, filed on Dec. 14, 2015.

(51) Int. Cl.
   *G05B 19/042* (2006.01)
   *G05B 11/42* (2006.01)
   (Continued)

(52) U.S. Cl.
   CPC ............ *G05B 19/042* (2013.01); *B29C 45/76* (2013.01); *B29C 45/77* (2013.01); *G05B 11/42* (2013.01); *B29C 2945/76006* (2013.01); *B29C 2945/7621* (2013.01); *B29C 2945/76257* (2013.01); *B29C 2945/76367* (2013.01); *B29C 2945/76381* (2013.01); *B29C 2945/76384* (2013.01);
   (Continued)

(58) Field of Classification Search
   CPC ....... B29C 45/77; B29C 45/76; B29C 45/762; B29C 45/78; B29C 45/5008; B29C 2945/76006; B29C 2945/7621; B29C 2945/76257; B29C 2945/76367; B29C 2945/76381; B29C 2945/76384; B29C 2945/76397; B29C 2945/76568; B29C 2945/76595; B29C 2945/76665; B29C 2945/76936; B29C 2945/76969; G05B 19/042; G05B 11/42; G05B 2219/2624
   USPC ........................................................ 700/200
   See application file for complete search history.

(56) References Cited

U.S. PATENT DOCUMENTS 4,311,446 A * 1/1982 Hold ...................... B29C 45/76
                                                              425/144
4,988,273 A * 1/1991 Faig ..................... B29C 45/5008
                                                              425/145

(Continued)

FOREIGN PATENT DOCUMENTS

| EP | 2919023 A1 | 9/2015 |
|---|---|---|
| WO | WO-2016/048934 A1 | 3/2016 |

OTHER PUBLICATIONS

International Search Report and Written Opinion, International Application No. PCT/US2016/065499, dated Mar. 14, 2017.

*Primary Examiner* — Brian W Wathen
*Assistant Examiner* — Alicia M. Choi
(74) *Attorney, Agent, or Firm* — Marshall, Gerstein & Borun LLP

(57) ABSTRACT

A remote controller can be provided on any apparatus that employs feedback control from a native controller to add functionality to the apparatus where the native controller is not capable of providing such functionality independently.

24 Claims, 2 Drawing Sheets

(51) Int. Cl.
  *B29C 45/76*  (2006.01)
  *B29C 45/77*  (2006.01)
(52) U.S. Cl.
  CPC ............... *B29C 2945/76397* (2013.01); *B29C 2945/76568* (2013.01); *B29C 2945/76595* (2013.01); *B29C 2945/76665* (2013.01); *B29C 2945/76936* (2013.01); *B29C 2945/76969* (2013.01); *G05B 2219/2624* (2013.01)

(56) References Cited

U.S. PATENT DOCUMENTS

| | | | | |
|---|---|---|---|---|
| 5,595,693 | A * | 1/1997 | Fujita | B29C 45/766 264/328.1 |
| 5,706,193 | A | 1/1998 | Linzenkirchner | |
| 6,042,760 | A * | 3/2000 | Nakazawa | B29C 45/50 264/328.1 |
| 6,681,145 | B1 * | 1/2004 | Greenwood | B25J 9/1692 700/176 |
| 6,684,145 | B1 * | 1/2004 | Gianoglio | F02D 41/021 123/399 |
| 7,160,490 | B2 * | 1/2007 | Hofmann | B29C 45/76 264/328.1 |
| 9,908,273 | B2 * | 3/2018 | de Oliveira Antunes | B29C 45/76 |
| 2008/0039970 | A1 * | 2/2008 | Manda | B22D 17/32 700/202 |
| 2009/0099710 | A1 * | 4/2009 | Takach, Jr. | B60T 7/16 701/2 |
| 2009/0283177 | A1 * | 11/2009 | Haas | B67C 3/222 141/11 |
| 2009/0323257 | A1 * | 12/2009 | Sarid | H02G 3/00 361/631 |
| 2012/0071702 | A1 * | 3/2012 | Butler | B01J 19/008 585/733 |
| 2012/0277900 | A1 * | 11/2012 | Catoen | B29C 45/73 700/202 |
| 2013/0033221 | A1 * | 2/2013 | Ueda | G05B 13/041 318/689 |
| 2013/0069280 | A1 * | 3/2013 | Altonen | B29C 45/77 264/328.1 |
| 2014/0037779 | A1 * | 2/2014 | Olaru | B29C 45/76 425/135 |
| 2014/0046465 | A1 * | 2/2014 | de Oliveira Antunes | B29C 45/76 700/97 |
| 2015/0035188 | A1 | 2/2015 | Altonen et al. | |
| 2015/0115491 | A1 * | 4/2015 | Altonen | B29C 45/7646 264/40.7 |
| 2016/0158985 | A1 * | 6/2016 | Fitzpatrick | B29C 45/03 700/202 |
| 2017/0057148 | A1 * | 3/2017 | Altonen | B29C 45/77 |

* cited by examiner

REMOTE CONTROLLER FOR CONTROLLING APPARATUS BY DIVERTING FEEDBACK SIGNAL FROM NATIVE CONTROLLER TO THE REMOTE CONTROLLER AND METHODS FOR SAME

CROSS-REFERENCE TO RELATED APPLICATION

This application claims benefit of the filing date of U.S. Provisional Patent Application No. 62/266,996, filed Dec. 14, 2015, which provisional application is hereby incorporated by reference.

TECHNICAL FIELD

The systems and methods described below generally relate to the field of remote controllers for controlling a native feedback controller of an apparatus.

BACKGROUND

Injection molding is commonly used for manufacturing of parts made of meltable material, such as thermoplastic polymers. To facilitate the injection molding of these parts, a solid plastic resin is introduced to a heated barrel that houses a reciprocating screw. The heated barrel and reciprocating screw cooperate to facilitate melting of the plastic and injecting the melted plastic into a mold cavity for forming into a desired shape. Conventionally, an injection molding machine includes a controller that controls various components during the molding process.

SUMMARY

In accordance with one embodiment, a method of manipulating a feedback signal for a native feedback controller of an apparatus is provided. The apparatus comprises a native controller and a remote controller retrofit to the native controller. The method comprises sensing a first control variable of the apparatus at a first sensor and generating a first feedback signal by the first sensor based upon the first control variable. The method further comprises sensing a second control variable of the apparatus at a second sensor and generating a second feedback signal by the second sensor based upon the second control variable. At the remote controller the method further comprises receiving the first feedback signal and the second feedback signal, generating a control signal based upon the second feedback signal, combining the control signal and the first feedback signal into a modified feedback signal, and transmitting the modified feedback signal to the native controller in lieu of the first feedback signal. The method further comprises, at the native controller, controlling operation of the actuation unit based at least in part upon the modified feedback signal.

In accordance with another embodiment, a method of controlling a melt pressure of an injection molding apparatus is provided. The injection molding apparatus comprises a heated barrel, an injection shaft, an actuation unit, and a native controller. The actuation unit is operably coupled with the injection shaft and is configured to facilitate operation of the injection shaft with respect to the heated barrel. The method comprises sensing a first control variable of the apparatus at a first sensor and generating a first feedback signal by the first sensor based upon the first control variable. The method further comprises sensing a pressure of the injection molding apparatus at a second sensor and generating a second feedback signal by the second sensor based upon the pressure of the injection molding apparatus. At the remote controller, the method comprises receiving the first feedback signal and the second feedback signal, comparing the pressure of the injection molding apparatus to a desired pressure setpoint, generating a control signal based upon the pressure and the desired pressure setpoint, combining the control signal and the first feedback signal into a modified feedback signal, and transmitting the modified feedback signal to the native controller in lieu of the first feedback signal. At the native controller the method further comprises controlling operation of the actuation unit based at least in part upon the modified feedback signal In accordance with another embodiment, an injection molding apparatus comprises an injection molding apparatus that comprises a heated barrel, an injection shaft, an actuation unit, a clamping unit, a nozzle, a native controller, a remote controller, a first sensor, and a second sensor. The injection shaft is disposed in the heated barrel and is configured to rotate with respect to the heated barrel. The actuation unit is operably coupled with the injection shaft and is configured to facilitate operation of the injection shaft with respect to the heated barrel. The clamping unit is for a mold. The clamping unit is associated with the heated barrel. The nozzle is disposed at one end of the heated barrel and is configured to distribute contents of the heated barrel to the clamping unit. The native controller is in communication with the actuation unit and is configured to facilitate operation of the injection shaft. The remote controller is in communication with the native controller. The first sensor is in communication with the remote controller and is configured to sense a first control variable of the injection molding apparatus. The second sensor is in communication with the remote controller and is configured to sense a pressure of the injection molding apparatus. The remote controller is configured to detect the first control variable from the first sensor, detect the pressure from the second sensor, and compare the pressure to a desired pressure setpoint. The remote controller is further configured to generate a control signal based at least in part upon the pressure and the desired pressure setpoint, combine the control signal and the first feedback signal into a modified feedback signal, and transmit the modified feedback signal to the native controller in lieu of the first feedback signal. The native controller is configured to control operation of the actuation unit based upon the modified feedback signal.

BRIEF DESCRIPTION OF THE DRAWINGS

It is believed that certain embodiments will be better understood from the following description taken in conjunction with the accompanying drawings in which.

DETAILED DESCRIPTION

Embodiments disclosed herein generally relate to systems, machines, products, and methods of producing products by injection molding and, more specifically, to systems, machines, products, and methods of producing products by low, substantially constant pressure injection molding.

The term "substantially constant pressure" as used herein with respect to a melt pressure of a thermoplastic material, means that deviations from a baseline melt pressure do not produce meaningful changes in physical properties of the thermoplastic material. For example, "substantially constant pressure" includes, but is not limited to, pressure variations for which viscosity of the melted thermoplastic material does not meaningfully change. The term "substantially constant" in this respect includes deviations of approximately 30% from a baseline melt pressure. For example, the term "a substantially constant pressure of approximately 4600 psi" includes pressure fluctuations within the range of about 6000 psi (30% above 4600 psi) to about 3200 psi (30% below 4600 psi). A melt pressure is considered substantially constant as long as the melt pressure fluctuates no more than 30% from the recited pressure.

Figure 1:
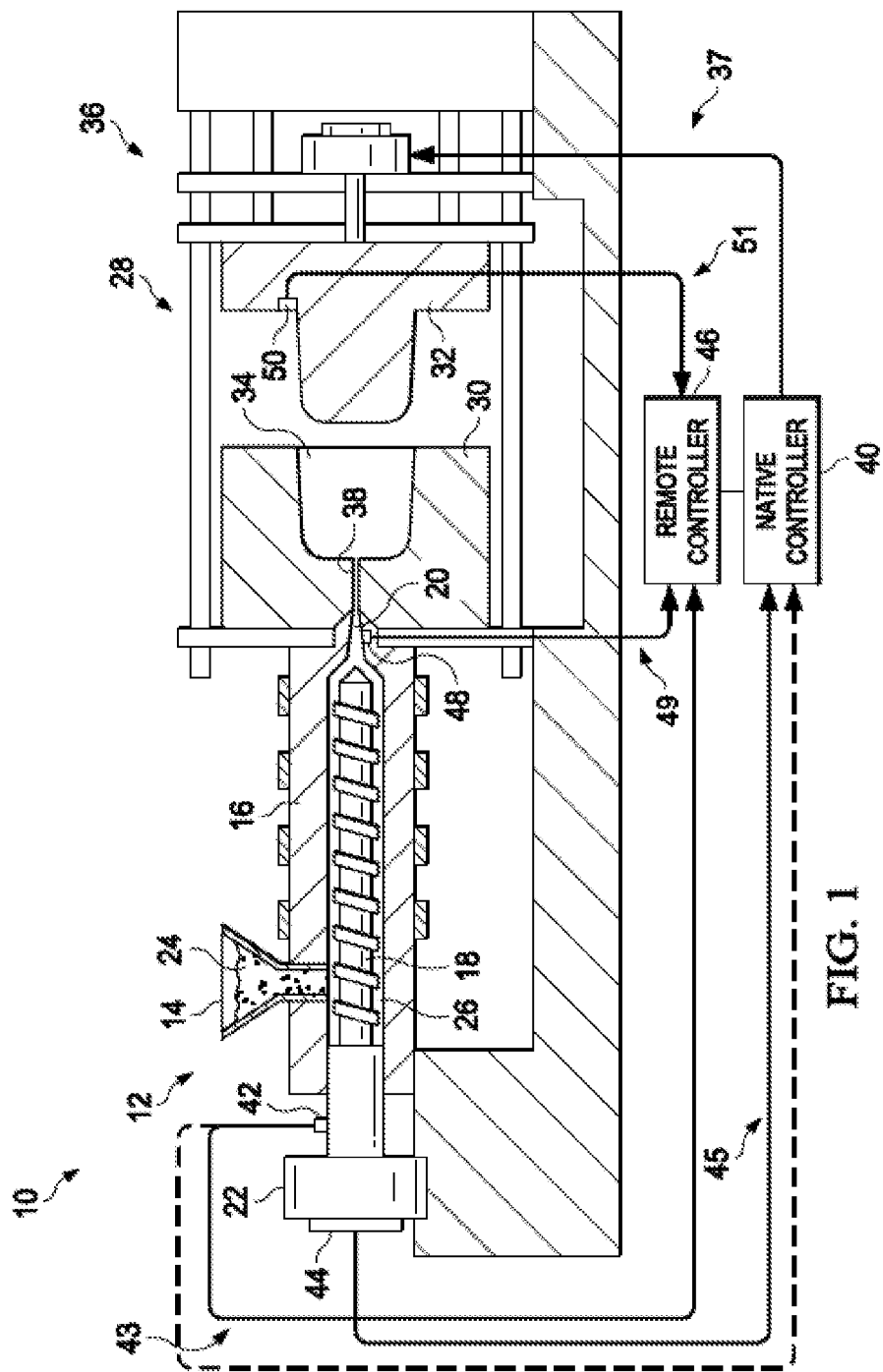
FIG. 1 is a schematic view depicting an injection molding apparatus in accordance with one embodiment.
Figure 2:
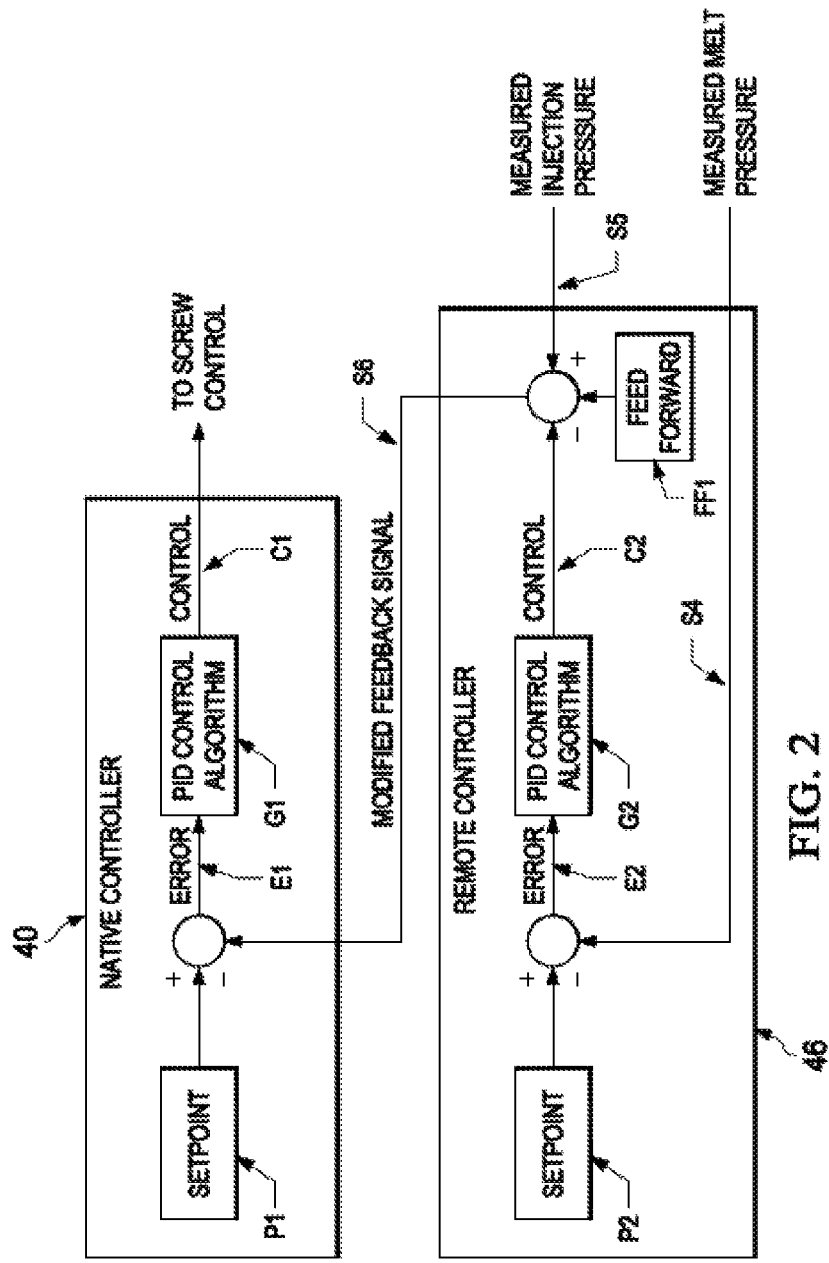
FIG. 2 is a block diagram depicting a native controller of the injection molding apparatus of FIG. 1 in association with a remote controller.

In connection with the views and examples of FIGS. 1-2, wherein like numbers indicate the same or corresponding elements throughout the views, FIG. 1 illustrates an injection molding apparatus 10 for producing molded plastic parts. The injection molding apparatus 10 can include an injection molding unit 12 that includes a hopper 14, a heated barrel 16, a reciprocating screw 18, and a nozzle 20. The reciprocating screw 18 can be disposed in the heated barrel 16 and configured to reciprocate with respect to the heated barrel 16. An actuation unit 22 can be operably coupled to the reciprocating screw 18 to facilitate powered reciprocation of the reciprocating screw 18. In some embodiments, the actuation unit 22 can comprise a hydraulic motor. In some embodiments, the actuation unit 22 can comprise an electric motor. In other embodiments, an actuation unit can additionally or alternatively comprise a valve, a flow controller, an amplifier, or any of a variety of other suitable control devices for injection molding apparatuses or non-injection molding apparatuses. Thermoplastic pellets 24 can be placed into the hopper 14 and fed into the heated barrel 16. Once inside the heated barrel 16, the thermoplastic pellets 24 can be heated (e.g., to between about 130 degrees C. to about 410 degrees C.) and melted to form a molten thermoplastic material 26. The reciprocating screw 18 can reciprocate within the heated barrel 16 to drive the molten thermoplastic material 26 into the nozzle 20.

The nozzle 20 can be associated with a mold 28 having first and second mold portions 30, 32 that cooperate to form a mold cavity 34. A clamping unit 36 can support the mold 28 and can be configured to move the first and second mold portions 30, 32 between a clamped position (not shown) and an unclamped position (FIG. 1). When the first and second mold portions 30, 32 are in the clamped position, molten thermoplastic material 26 from the nozzle 20 can be provided to a gate 38 defined by the first mold portion 30 and into the mold cavity 34. As the mold cavity 34 is filled, the molten thermoplastic material 26 can take the form of the mold cavity 34. Once the mold cavity 34 has been sufficiently filled, the reciprocating screw 18 can stop, and the molten thermoplastic material 26 is permitted to cool within the mold 28. Once the molten thermoplastic material 26 has cooled and is solidified, or at least partially solidified, the first and second mold portions 30, 32 can be moved to their unclamped positions to allow the molded part to be removed from the mold 28. In some embodiments, the mold 28 can include a plurality of mold cavities (e.g., 34) to increase overall production rates.

The clamping unit 36 can apply a clamping force in the range of approximately 1000 P.S.I. to approximately 6000 P.S.I. during the molding process to hold the first and second mold portions 30, 32 together in the clamped position. To support these clamping forces, the mold 28, in some embodiments, can be formed from a material having a surface hardness from more than about 165 BHN to less than 260 BHN, although materials having surface hardness BHN values of greater than 260 may be used as long as the material is easily machineable, as discussed further below. In some embodiments, the mold 28 can be a class 101 or 102 injection mold (e.g., an "ultra-high productivity mold").

The injection molding apparatus 10 can include a native controller 40 that is in signal communication with various components of the injection molding apparatus 10. For example, the native controller 40 can be in signal communication with a screw control 44 via a signal line 45. The native controller 40 can command the screw control 44 to advance the reciprocating screw 18 at a rate that maintains a desired molding process, such that variations in material viscosity, mold temperatures, melt temperatures, and other variations influencing filling rate, are taken into account by the native controller 40. Adjustments may be made by the native controller 40 immediately during the molding cycle, or corrections can be made in subsequent cycles. Furthermore, several signals, from a number of cycles can be used as a basis for making adjustments to the molding process by the native controller 40.

The native controller 40 can be any of a variety of suitable controllers for controlling the molding process. In some embodiments, the native controller 40 can be a PID controller. The native controller 40 can be responsible for controlling a variety of different functions on the injection molding apparatus 10, such as, for example, movement of the clamping unit 36 via a signal line 37. The native controller 40 can be an on-board controller that is original to the injection molding unit 12 and built together with the injection molding unit 12. As such, modifications to the control architecture of the native controller 40 can be time consuming, expensive and at times impossible.

In one embodiment, when the actuation unit 22 is a hydraulic motor, the screw control 44 can comprise a hydraulic valve associated with the reciprocating screw 18. In another embodiment, when the actuation unit 22 is an electric motor, the screw control 44 can comprise an electric controller associated with the reciprocating screw 18. In the embodiment of FIG. 1, the native controller 40 can generate a signal that is transmitted from an output of the native controller 40 to the screw control 44.

Still referring to FIG. 1, a remote controller 46 can be in signal communication with the native controller 40, a melt pressure sensor 48 located in, at, or near, the nozzle 20, and with a cavity pressure sensor 50 located proximate an end of the mold cavity 34. The melt pressure sensor 48 can facilitate detection (direct or indirect) of the actual melt pressure (e.g., the measured melt pressure) of the molten thermoplastic material 26 at or near the nozzle 20. The melt pressure sensor 48 may or may not be in direct contact with the molten thermoplastic material 26. In some embodiments, the melt pressure sensor 48 can be a pressure transducer that transmits an electrical signal via a signal line 49 to an input of the native controller 40 in response to the melt pressure at the nozzle 20. In some embodiments, the melt pressure sensor 48 can facilitate monitoring of any of a variety of additional or alternative characteristics of the molten thermoplastic material 26 at the nozzle 20 that might indicate melt pressure, such as temperature, viscosity, and/or flow rate, for example. If the melt pressure sensor 48 is not located within the nozzle 20, the native controller 40 can be set, configured, and/or programmed with logic, commands, and/or executable program instructions to provide appropriate correction factors to estimate or calculate values for the measured characteristic in, at, or near the nozzle 20. It is to be appreciated that sensors other than a melt pressure sensor can be employed to measure any other characteristics of the molten thermoplastic material 26, the screw 18, the barrel, or the like that is known in the art, such as, temperature, viscosity, flow rate, strain, velocity, etc. or one or more of any other characteristics that are indicative of any of these.

The cavity pressure sensor 50 can facilitate detection (direct or indirect) of the melt pressure of the molten thermoplastic material 26 in, at, or near the nozzle 20. The cavity pressure sensor 50 may or may not be in direct contact with the molten thermoplastic material 26. In some embodiments, the cavity pressure sensor 50 can be a pressure transducer that transmits an electrical signal via a signal line 51 to an input of the native controller 40 in response to the cavity pressure within the mold cavity 34. In other embodiments, the cavity pressure sensor 50 can facilitate monitoring of any of a variety of additional or alternative characteristics of the thermoplastic material 26 or the mold 28 that might indicate cavity pressure, such as strain and/or flow rate of the molten thermoplastic material 26, for example. If the cavity pressure sensor 50 is not located within the mold cavity 34, the native controller 40 can be set, configured, and/or programmed with logic, commands, and/or executable program instructions to provide appropriate correction factors to estimate or calculate values for the measured characteristic of the mold 28.

As will be described in more detail below, the remote controller 46 can sense the melt pressure and/or the cavity pressure of the injection molding apparatus 10 and can send a signal (e.g., a modified feedback signal) to the native controller 40 that affects the manner in which the native controller 40 controls the reciprocating screw 18. The remote controller 46 can be any of a variety of suitable controllers for providing a modified feedback signal to the native controller 40 to facilitate alternative control of the molding process. In some embodiments, the remote controller 46 can be a PID controller. In some embodiments, the remote controller 46 can be retrofitted onto the injection molding unit 12 to provide additional functionality not capable of being provided by the native controller 40.

Prior to retrofitting the remote controller 46 onto the injection molding apparatus 10, the native controller 40 can be in signal communication with an injection pressure sensor 42 (shown in dashed lines) located at the actuation unit 22. The injection pressure sensor 42 can facilitate detection (direct or indirect) of the injection pressure inside of the heated barrel 16 (i.e., the pressure of the heated barrel 16 at the beginning of the reciprocating screw 18) by providing a feedback signal via a signal line 43 to the native controller 40. The native controller 40 can detect the injection pressure from the feedback signal and can control (e.g., feedback control) the pressures within the injection molding apparatus 10 by controlling the screw control 44, which controls the rates of injection by the injection molding unit 12. To retrofit (e.g., associate) the remote controller 46 onto the injection molding apparatus 10, the output from the injection pressure sensor 42 can be disconnected from the native controller 40 and connected to the remote controller 46 thereby diverting the feedback signal from the injection pressure sensor 42 to the remote controller 46. The melt pressure sensor 48 and/or cavity pressure sensor 50 can then be coupled to the remote controller 46 thereby completing the retrofit. Once the retrofit is complete, the native controller 40 no longer directly receives feedback signals from the injection pressure sensor 42, the melt pressure sensor 48, or the cavity pressure sensor 50. Instead, the remote controller 46 receives these feedback signals and transmits a modified feedback signal to the native controller 40 that enhances the operation of the native controller 40, as described below. The native controller 40 and the remote controller 46 thus operate in a closed-loop type arrangement that existed prior to addition of the remote controller 46.

In some embodiments, the melt pressure sensor 48 and the cavity pressure sensor 50 can already exist on the injection molding unit 12 and can be in signal communication with the native controller 40. In such an embodiment, the outputs from the melt pressure sensor 48 and the cavity pressure sensor 50 can be disconnected from the native controller 40 and reconnected to the remote controller 46. In some embodiments, the melt pressure sensor 48 and the cavity pressure sensor 50 might not already exist on the injection molding unit 12. In such an embodiment, the melt pressure sensor 48 and the cavity pressure sensor 50 can be installed during retrofitting of the remote controller 46 and then connected to the remote controller 46.

An example block diagram of the feedback relationship between the native controller 40 and the remote controller 46 is illustrated in FIG. 2 and will now be discussed. At the remote controller 46, a setpoint P2 can be provided that represents a desired melt pressure of the injection molding apparatus 10. A signal S4 can be provided to the remote controller 46 that indicates the actual melt pressure of the injection molding apparatus 10. The actual melt pressure can be compared against the setpoint P2 and an error signal E2 can be generated and provided to a PID control algorithm G2 that generates a control signal C2. A signal S5 can be provided to the remote controller 46 that indicates the measured injection pressure of the actuation unit 22. The control signal C2 and the signal S5 can be combined into a modified feedback signal S6. In some embodiments, the modified feedback signal S6 can also include a feedforward component FF1. The modified feedback signal S6 can additionally or alternatively include any of a variety of other suitable control components that facilitate generation of an effective modified feedback signal.

The modified feedback signal S6 can be transmitted to the native controller 40 in lieu of the feedback signal from the injection pressure sensor 42 (shown in dashed lines on FIG. 1). In one embodiment, the modified feedback signal S6 can be transmitted over a unidirectional transmission link between the native controller 40 and the remote controller 46. In such an embodiment, the native controller 40 does not transmit any signals to the remote controller 46.

At the native controller 40, the operation of the actuation unit 22 can be controlled according to the modified feedback signal S6. For example, a setpoint P1 can be provided that represents a desired injection pressure of the actuation unit 22. The setpoint P1 can be compared against the modified feedback signal S6 and an error signal E1 can be generated. The error signal E1 can be provided to a PID control algorithm G1 that generates a control signal C1 that commands the screw control 44 to advance the reciprocating screw 18 at a rate that causes the injection pressure to converge towards the desired injection pressure indicated by the setpoint P1.

Although the native controller 40 is controlling to the desired injection pressure of the setpoint P1, the modified feedback signal S6 from the remote controller 46 can affect the control signal C1 from the native controller 40 in a manner that actually controls the melt pressure of the injection molding apparatus 10 to the desired pressure defined by the setpoint P2 (rather than controlling the injection pressure of the actuation unit 22 to the setpoint P1). The remote controller 46 can thus provide the capability to control the melt pressure of the injection molding unit 12 without requiring reprograming/reconfiguration of the control architecture of the native controller 40. As such, the remote controller 46 can be a cost effective and straightforward solution to add functionality to the injection molding apparatus 10 where the native controller 40 is not capable of providing such functionality independently.

During a molding cycle, the melt pressure of the injection molding unit 12 can be changed by changing the setpoint P2. In one embodiment, different setpoints can correspond to a different stage of the molding cycle. For example, to initiate the initial injecting stage, a setpoint can be provided that causes the melt pressure to increase enough to begin melting the thermoplastic pellets 24 and distributing the melt to the nozzle 20. Once the melt pressure has increased enough to begin filling the mold cavity 34, a setpoint can be provided that initiates the filling stage at a pressure that is appropriate to properly fill the mold cavity 34. Once the mold cavity 34 is almost filled (e.g., end of fill), a setpoint can be provided to decrease enough to initiate the packing stage and hold at a substantially constant melt pressure during the holding stage.

The native controller 40 and/or the remote controller 46 can be implemented in hardware, software or any combination of both and can have any control arrangement having one or more controllers for accomplishing control. It is to be appreciated that, although the native controller 40 is described as sensing and controlling the injection pressure of the actuation unit 22, a native controller 40 can be configured to sense and control any of a variety of suitable alternative control variables, such as, for example, a temperature of the heated barrel 16, a volume of the hopper 14, or velocity of the reciprocating screw 18. It is also to be appreciated that, although the remote controller 46 is described as providing the capability to control the melt pressure of the injection molding unit 12, a remote controller using the injection pressure of the actuation unit 22 can be configured to sense and control any of a variety of suitable alternative control variables, such as, for example, cavity pressure.

The foregoing description of embodiments and examples has been presented for purposes of illustration and description. It is not intended to be exhaustive or limiting to the forms described. For, example, although the remote controller 46 is described as being provided on an injection molding apparatus, a remote controller can be provided on any apparatus that employs feedback control from a native controller to add functionality to the apparatus where the native controller is not capable of providing such functionality independently. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of manipulating a first feedback signal for a native feedback controller of an apparatus, the apparatus further comprising a remote controller configured via a retrofitting to the native controller, wherein the native controller prior to the retrofitting is configured to control an operation of an actuation unit of the apparatus via a first control algorithm based upon the first feedback signal, and the method comprising:
   sensing a first control variable of the apparatus at a first sensor;
   generating the first feedback signal by the first sensor based upon the first control variable;
   sensing a second control variable of the apparatus at a second sensor;
   generating a second feedback signal by the second sensor based upon the second control variable;
   at the remote controller:
      receiving, from the first sensor, the first feedback signal;
      receiving, from the second sensor, the second feedback signal;
      generating a control signal via a second control algorithm based upon the second feedback signal;
      combining the control signal and the first feedback signal into a modified feedback signal; and
      transmitting the modified feedback signal to the native controller in lieu of the first feedback signal; and
   at the native controller, controlling the operation of the actuation unit of the apparatus via the first control algorithm based at least in part upon the modified feedback signal, to thereby modify the control of the operation of the actuation unit performed at the native controller.

2. The method of claim 1 wherein the apparatus comprises an injection molding apparatus comprising a heated barrel, an injection shaft, and the actuation unit, the actuation unit being operably coupled with the injection shaft and configured to facilitate an operation of the injection shaft with respect to the heated barrel.

3. The method of claim 2, wherein the sensing of the first control variable of the apparatus comprises the sensing of a first control variable of the injection molding apparatus and wherein the sensing of the second control variable of the apparatus comprises sensing a melt pressure of the heated barrel of the injection molding apparatus.

4. The method of claim 3, wherein the first control variable of the injection molding apparatus comprises one or more of an injection pressure of the heated barrel, a temperature of the heated barrel, and a volume of a hopper.

5. The method of claim 2 wherein:
the sensing of the first control variable of the injection molding apparatus comprises receiving a first signal of the first control variable at the first sensor; and
the sensing of the second control variable of the injection molding apparatus comprises receiving a second signal of the second control variable at the second sensor and determining a value for the second control variable based upon the second signal.

6. The method of claim 5 wherein the generating of the control signal based upon the second feedback signal comprises:
defining a desired setpoint for the second control variable of the injection molding apparatus;
comparing the desired setpoint to the value of the second control variable of the injection molding apparatus; and
generating an offset signal based upon a difference between the value of the second control variable of the injection molding apparatus and the desired setpoint.

7. The method of claim 6 wherein the sensing of the second control variable of the injection molding apparatus comprises receiving a melt pressure signal at a melt pressure sensor configured to detect a melt pressure of the heated barrel.

8. The method of claim 7 wherein:
the defining of the desired setpoint for the second control variable of the injection molding apparatus comprises defining a desired melt pressure setpoint; and
controlling the operation of the actuation unit further comprises controlling the operation of the actuation unit to achieve a melt pressure inside the heated barrel in response to the melt pressure setpoint.

9. The method of claim 2 wherein the injection shaft comprises a reciprocating screw.

10. The method of claim 9 wherein the controlling of the operation of the actuation unit based upon the modified feedback signal comprises controlling a reciprocation of the reciprocating screw.

11. The method of claim 1 wherein the actuation unit comprises one of a hydraulic motor and an electric motor.

12. A method of controlling a pressure of an injection molding apparatus via a remote controller configured via a retrofitting to a native controller of the injection molding apparatus, the injection molding apparatus comprising a heated barrel, an injection shaft, and an actuation unit, the actuation unit being operably coupled with the injection shaft and configured to facilitate an operation of the injection shaft with respect to the heated barrel, the native controller prior to the retrofitting being configured to control the operation of the actuation unit via a first control algorithm based upon a first feedback signal, and the method comprising:
sensing a first control variable of the injection molding apparatus at a first sensor;
generating the first feedback signal by the first sensor based upon the first control variable;
sensing a pressure of the injection molding apparatus at a second sensor;
generating a second feedback signal by the second sensor based upon the pressure of the injection molding apparatus;
at the remote controller:
receiving, from the first sensor, the first feedback signal;
receiving, from the second sensor, the second feedback signal;
comparing the second feedback signal to a desired pressure setpoint;
generating a control signal via a second control algorithm based upon the comparing of the second feedback signal to the desired pressure setpoint;
combining the control signal and the first feedback signal into a modified feedback signal; and
transmitting the modified feedback signal to the native controller in lieu of the first feedback signal; and
at the native controller, controlling the operation of the actuation unit via the first control algorithm based at least in part upon the modified feedback signal, to thereby modify the control of the operation of the actuation unit performed at the native controller.

13. The method of claim 12 wherein:
the sensing of the pressure of the injection molding apparatus comprises sensing a melt pressure of the injection molding apparatus;
the comparing of the second feedback signal to the desired pressure setpoint comprises comparing the second feedback signal to a desired melt pressure setpoint; and
the generating of the control signal comprises generating the control signal based upon the comparing of the second feedback signal to the desired melt pressure setpoint.

14. The method of claim 12 wherein:
the sensing of the pressure of the injection molding apparatus comprises sensing a cavity pressure of the injection molding apparatus;
the comparing of the pressure of the injection molding apparatus to the desired pressure setpoint comprises comparing the cavity pressure of the injection molding apparatus to a desired cavity pressure setpoint; and
the generating of the control signal comprises generating the control signal based upon the cavity pressure and the desired cavity pressure setpoint.

15. The method of claim 13 wherein:
the sensing of the first control variable of the injection molding apparatus comprises receiving a signal at the first sensor;
the sensing of the melt pressure of the injection molding apparatus further comprises, at the remote controller:
receiving a melt pressure signal from the second sensor; and
determining a value for the melt pressure based upon the melt pressure signal; and
the comparing of the second feedback signal to the desired melt pressure setpoint comprises:
defining the desired melt pressure setpoint for the melt pressure; and
comparing the desired melt pressure setpoint to the value of the melt pressure as indicated by the second feedback signal.

16. The method of claim 12, wherein the first control variable of the injection molding apparatus comprises one or more of an injection pressure of the heated barrel, a temperature of the heated barrel, and a volume of a hopper.

17. The method of claim 12 wherein the injection shaft comprises a reciprocating screw.

18. The method of claim 17 wherein the controlling of the operation of the actuation unit based at least in part upon the modified feedback signal comprises controlling a reciprocation of the reciprocating screw.

19. The method of claim 12 wherein the actuation unit comprises one of a hydraulic motor and an electric motor.

20. An injection molding apparatus comprising:
a heated barrel;
an injection shaft disposed in the heated barrel and configured to rotate with respect to the heated barrel;
an actuation unit operably coupled with the injection shaft and configured to facilitate an operation of the injection shaft with respect to the heated barrel;
a clamping unit for a mold, the clamping unit being associated with the heated barrel;
a nozzle disposed at one end of the heated barrel and configured to distribute contents of the heated barrel to the clamping unit;
a native controller in communication with the actuation unit and configured to facilitate operation of the injection shaft;
a remote controller in communication with the native controller via a retrofitting of the remote controller to the native controller, wherein the native controller prior to the retrofitting is configured to control an operation of the actuation unit via a first control algorithm based upon a first control variable;
a first sensor in communication with the remote controller and configured to sense the first control variable of the injection molding apparatus;
a second sensor in communication with the remote controller and configured to sense a pressure of the injection molding apparatus;
wherein the remote controller is configured to:
receive, from the first sensor, the first control variable;
receive, from the second sensor, an indication of the pressure;
compare the pressure to a desired pressure setpoint;
generate a control signal via a second control algorithm based upon the pressure and the desired pressure setpoint;
combine the control signal and the first control variable into a modified feedback signal; and
transmit the modified feedback signal to the native controller in lieu of the first control variable;
wherein the native controller is configured to control the operation of the actuation unit via the first control algorithm based at least in part upon the modified feedback signal, to thereby modify the control of the operation of the actuation unit performed at the native controller.

21. The injection molding apparatus of claim 20 wherein the second sensor comprises a melt pressure sensor configured to sense a melt pressure of the heated barrel, and wherein the remote controller is further configured to:
receive the melt pressure from the melt pressure sensor;
compare the melt pressure to a desired melt pressure setpoint; and
generate the control signal based upon the melt pressure and the desired pressure setpoint.

22. The injection molding apparatus of claim 21 wherein:
the first sensor comprises an injection pressure sensor that is configured to sense an injection pressure of the heated barrel and generate an injection pressure signal;
the melt pressure sensor is configured to generate a melt pressure signal; and
the remote controller is further configured to:
receive the injection pressure signal from the injection pressure sensor;
receive the melt pressure signal from the melt pressure sensor;
determine a value for the melt pressure based upon the melt pressure signal;
define the desired melt pressure setpoint for the melt pressure; and
compare the desired melt pressure setpoint to the value of the melt pressure.

23. The injection molding apparatus of claim 20 wherein the modified feedback signal is transmitted over a unidirectional transmission link from the remote controller to the native controller, and the native controller does not transmit any signals to the remote controller.

24. The injection molding apparatus of claim 20 wherein the injector shaft comprises one of a reciprocating screw and a plunger.

* * * * *